United States Patent [19]
Hordeski et al.

[11] 4,131,168
[45] Dec. 26, 1978

[54] ASSEMBLY FIXTURES FOR MASS PRODUCIBLE WEIGHT MEASURING SYSTEM

[75] Inventors: Edward R. Hordeski, Stamford; Louis T. Canevari, Norwalk; Leonard J. Macari, Stamford, all of Conn.

[73] Assignee: Pitney-Bowes, Inc., Stamford, Conn.

[21] Appl. No.: 836,761

[22] Filed: Sep. 26, 1977

[51] Int. Cl.$^2$ ............................................. G01G 21/00
[52] U.S. Cl. ...................................................... 177/128
[58] Field of Search ............. 177/128, 210 R, DIG. 6, 177/164; 250/231 R, 237 G

[56] References Cited

U.S. PATENT DOCUMENTS 3,923,110  12/1975  Dan ............................... 177/DIG. 6

OTHER PUBLICATIONS

Terms and Definitions for the Weighing Industry, p. 84, prepared by Terminology Committee of the Scale Manufacturers Assocation, Inc. 1958.

Primary Examiner—George H. Miller, Jr.
Attorney, Agent, or Firm—Peter Vrahotes; William D. Soltow, Jr.; Albert W. Scribner

[57] ABSTRACT

A mass produced weight measuring system includes an optical transducer for determining the displacement of a scale load support structure with respect to a scale frame. The detector includes a transducer subassembly which carries a plurality of photodetectors positioned at the end of a light path which is modulated by a pair of optical gratings. One of the gratings is fixed relative to the scale frame, and the other is mounted to the load support structure in alignment with the fixed grating. To facilitate mass fabrication, the optical transducer is produced and both gratings adjusted for alignment as a subassembly unit independent of the scale frame and load support structure; the clearance between the grating planes is set and the movable grating temporarily fixed. Grating adjustment is facilitated by a clamping jig which mounts on the transducer. The jig includes two adjustment screws which contact an edge of the movable grating. Nonlinearities in scale load support deflection inherent with the scale linkage and providing components other than true vertical deflection are compensated by predetermined placement of the grating angle from a horizontal plane. During scale assembly, the scale frame and load support structure are placed in a main fixture, a transducer subassembly unit is selected, mounted to a subfixture and the grating planes referenced to scale assembly reference planes; then the transducer body is epoxy potted relative to the frame and the movable grating potted relative to the tare structure. The movable grating is then freed for movement relative to the transducer body.

10 Claims, 17 Drawing Figures

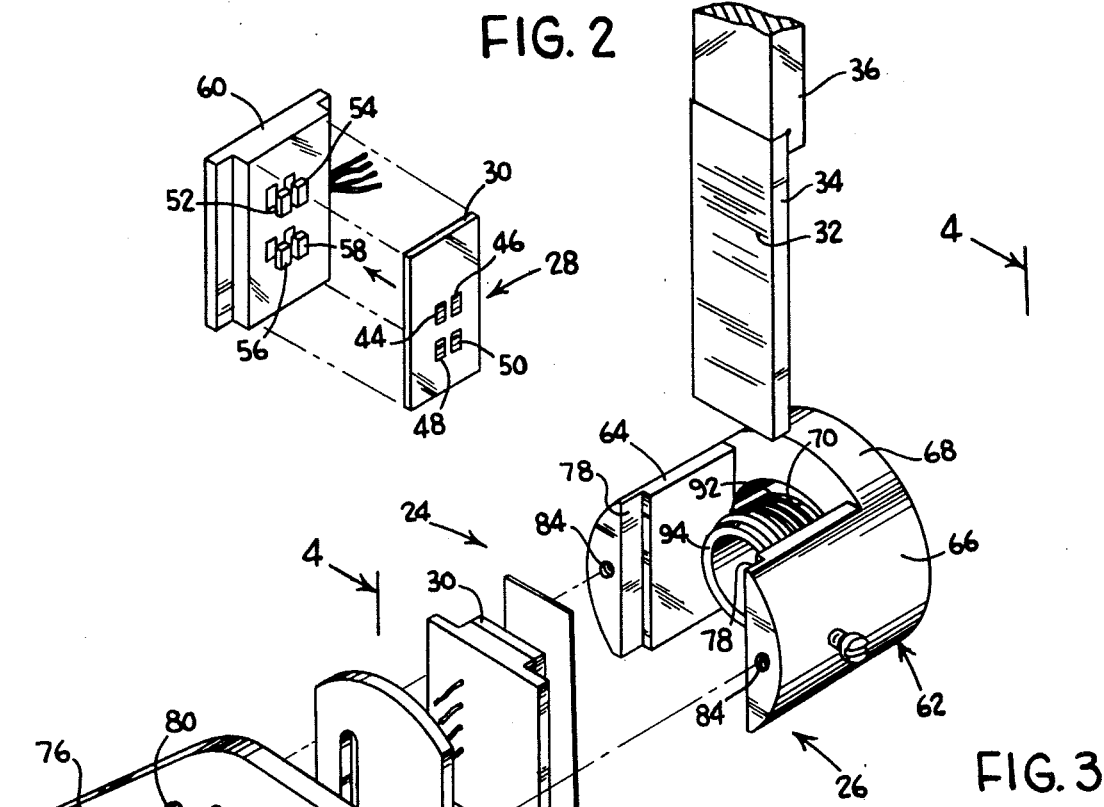
FIG. 2
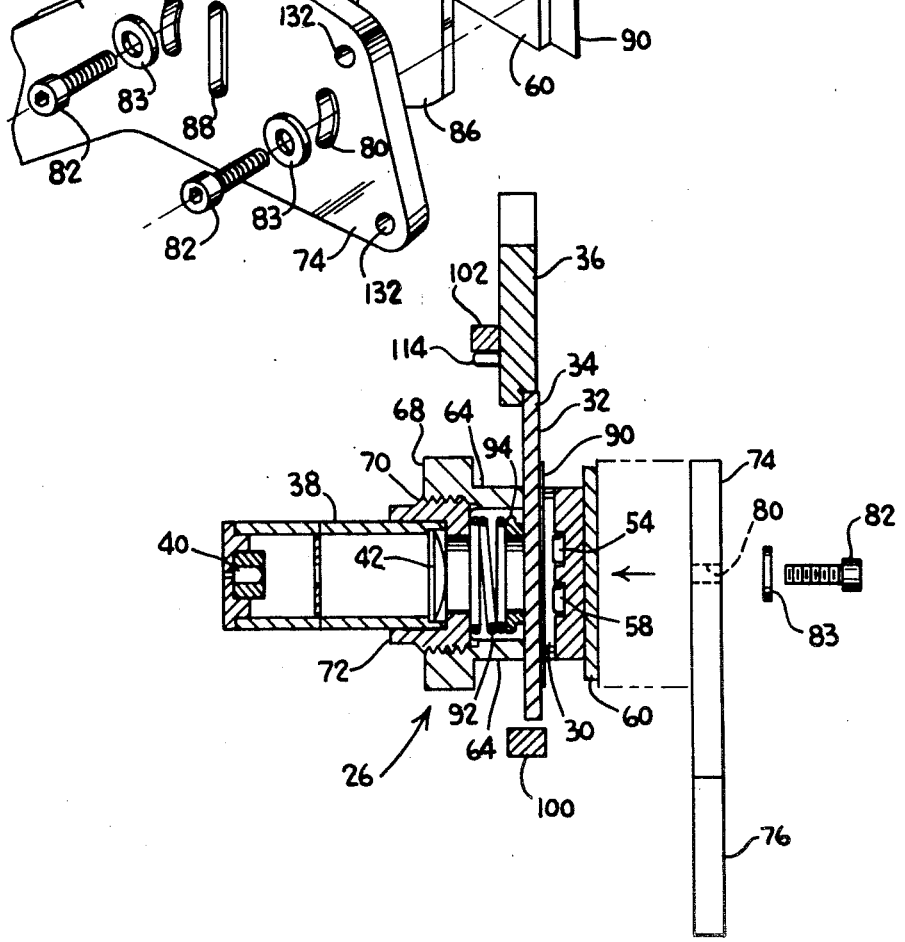
FIG. 3
FIG. 4

FIG. 5
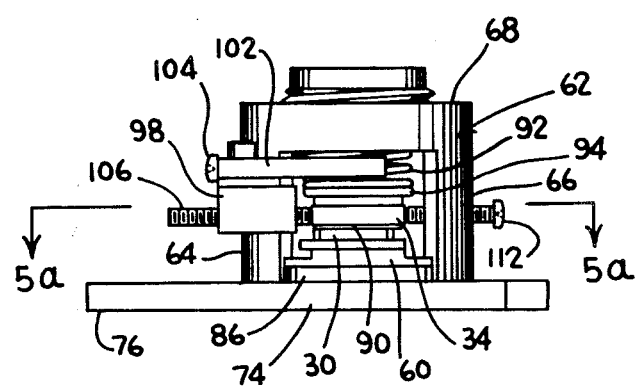
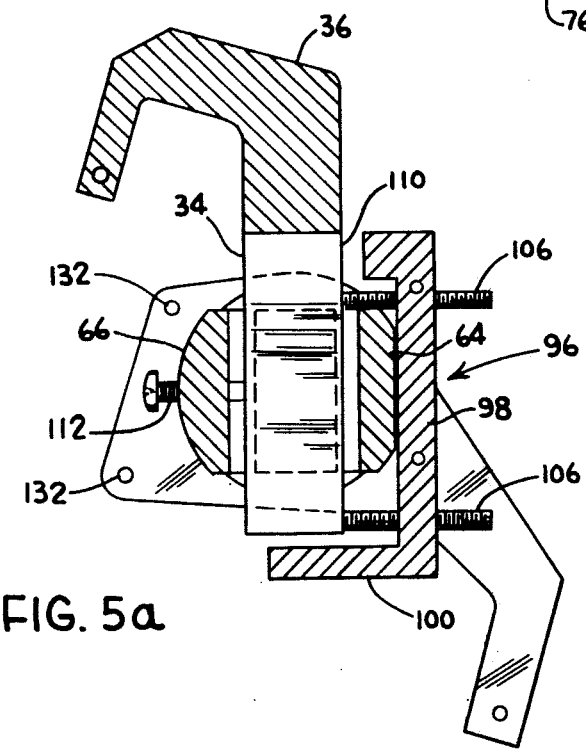
FIG. 5a
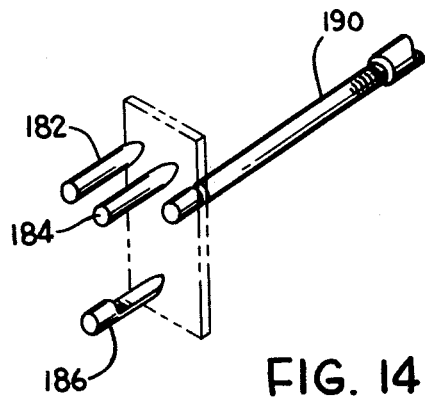
FIG. 14
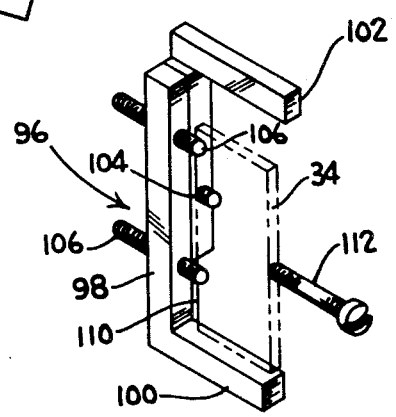
FIG. 6

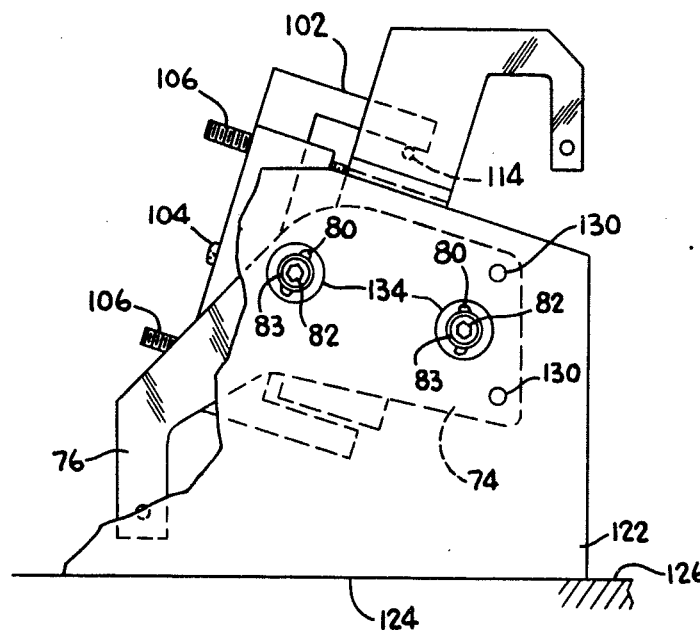
FIG. 9
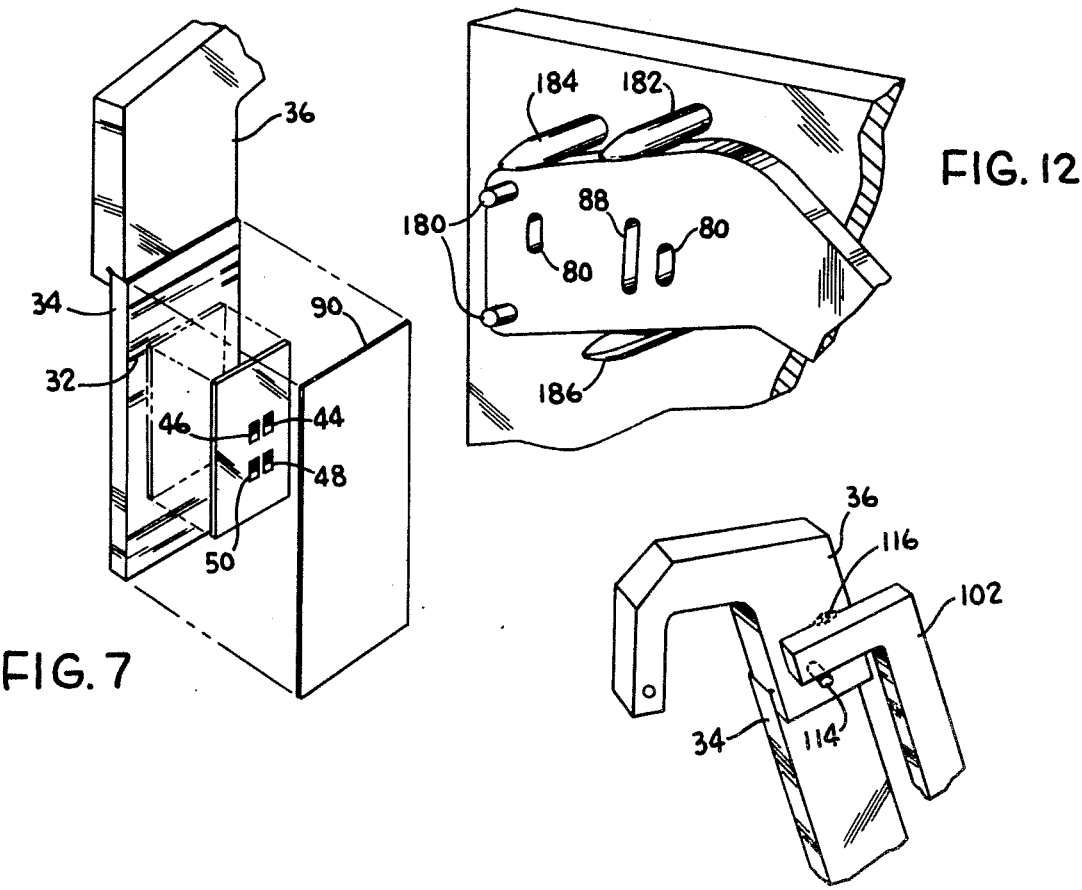
FIG. 12
FIG. 7
FIG. 8

ASSEMBLY FIXTURES FOR MASS PRODUCIBLE WEIGHT MEASURING SYSTEM

BACKGROUND OF THE INVENTION

1. Field of the Invention

The present invention relates to spring scales and more particularly to a mass producible scale having an optical detector.

2. Brief Description of the Prior Art

Optical detection and magnification of deflection has been employed for the purpose of precise measurement in conjunction with spring weighing scales to provide accurate and simplified readings. Typical with prior optical detectors used in conjunction with such scales has been the use of Rhonchi rulings for generating optical interference patterns. In general, such detectors comprised a pair of optical gratings, one movable with the scale load and support and the other fixed to the scale frame. Movement of the scale load support resulting from the placement of a load on a scale pan provided modulation of a light beam passing through the grating sets. With one grating set having its gratings skewed to the other, a moire interference pattern was generated. With both gratings parallel, the movable grating set acted as a shutter to modulate the light beam at a detectable rate with each light to dark transition indicating a displacement equal to a grating line spacing.

With either approach many problems were inherent with the use of optical gratings for detection purposes. For example, alignment of such optical systems was difficult and costly because clearance between the movable and fixed gratings had to be precisely controlled.

In U.S. Pat. No. 3,923,110 a spring scale having an optical detector is disclosed. The detector included a somewhat complex guiding mechanism for the purpose of accurately controlling the movement of a movable grating in a plane spaced from a fixed grating. Unfortunately, the guiding structure introduced further inaccuracies into the system by providing frictional losses between grating guides and the movable grating. Further, a flexible link interconnected the movable grating with the scale tare, and the employment of such link introduced additional error to the system.

It may be appreciated that the difficulty in achieving proper spacing between the grating sets and further optical grating alignments presented a significant drawback to production output of optical detection scales, because significant skilled labor was necessary. In production, a technician would be required to effect optical alignment. When gratings were separated by too great a distance, the resolution of the detector was sacrificed, while placement of the gratings too close to one another resulted in interference during load support structure movement. Further, it was necessary to assure that the grating sets lay within parallel planes to maintain integrity of resolution over the load support travel.

A scale having an optical detector which utilized skew gratings to provide a moire interference pattern was disclosed in a copending application: weighing with Moire Optoelectronic Transducer, Ser. No. 653,850, filed Jan. 30th, 1976, and assigned to the assignee of the present invention. In order to assure proper grating registration and control the travel path of a movable grating a plurality of guide rails were provided. Such guiding structure was not well suited to mass fabrication and increased scale costs, yet still required significant skilled labor to effect grating alignment.

SUMMARY OF THE INVENTION

In compendium, the invention comprises a mass producible weight measuring system having an optical detector for sensing the relative movement between a scale frame and a load support assembly. The optical detector includes a transducer subassembly unit carrying a plurality of photodetectors positioned at the end of a light path which is modulated by a pair of optical gratings. One of the gratings moves with the scale load support structure while the other is stationary. In order to provide signals suitable for processing, the stationary grating is divided into four discrete grating zones with the rulings of each zone phase displaced from the rulings of an adjacent zone. Four photodetectors, one positioned behind each grating zone, each generate phase quadrature displaced cyclic signals in response to load support deflection.

The optical transducer is fabricated as a subassembly unit with the movable grating and adjusted for grating registration, parallelism of grating planes, clearance between grating sets, and phase quadrature output independently of the scale assembly, after which the movable grating is temporarily fixed.

The adjustments for grating parallelism and phase quatrature output are facilitated by a clamping jig which mounts on the transducer. The jig includes adjustable grating abutments for grating orientation control.

Scale load support deflection is guided by a parallelogram linkage including a vertical tare link and a vertical scale frame link. The load support and frame links are joined by an upper and a lower control arm with each arm incorporating transverse flexure pivots adjacent each of its ends. Compensation for other than vertical components of load support deflection is provided by adjustment of the grating angle from the horizontal.

A fully adjusted transducer subassembly unit with the movable grating temporarily fixed is selected during assembly of the scale and referenced to appropriate horizontal and vertical scale frame planes through the use of fixtures; then the fixed grating is cemented relative to the scale frame and the movable grating is cemented relative to the load support. Subsequently, the movable grating is released from confinement relative to the transducer body and the scale fabrication completed.

From the above compendium, it will be appreciated that it is an object of the present invention to provide a weight measuring system of the general character described which is not subject to the disadvantages aforementioned.

It is a further object of the present invention to provide a weight measuring system of the general character described which is well adapted for mass fabrication.

Another object of the present invention is to provide a weight measuring system of the general character described having an optical detector incorporating preset optical parameters not requiring in situ adjustments.

A further object of the present invention is to provide a weight measuring system of the general character described having an optical detector which incorporates preset adjustments and is bonded relative to a scale deflection linkage.

A further object of the present invention is to provide a weight measuring system of the general character described including an optical detector having a pair of gratings the parameters of which have been preset with one grating being bonded relative to a scale load support and the other being bonded relative to a scale frame link.

A further object of the present invention is to provide a method of producing a weight measuring system of the general character described having an optical detector wherein adjustment of optical parameters is provided prior to scale assembly.

A further object of the present invention is to provide a fixture of the general character described which facilitates assembly of a weight measuring system having an optical detector.

Another object of the present invention is to provide a system for producing a weight measuring system of the general character described which requires but a modicum of skilled labor.

Another object of the present invention is to provide an assembly device for a weight measuring system of the general character described which facilitates grating adjustments in an optical detector.

Other objects of the invention in part will be obvious and in part will be pointed out hereinafter.

With these ends in view, the invention finds embodiment in certain combinations of elements, arrangements of parts and series of steps by which the objects aforementioned and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention.

FIG. 2 is an exploded perspective illustration of a fixed grating of the transducer and a plurality of photodetectors each positioned behind one of a like plurality of phase displaced zones of the grating;

FIG. 3 is an exploded perspective illustration of the transducer showing the relative positions of components thereof;

FIG. 4 is a sectional view through the transducer, the same taken substantially along the line 4—4 of FIG. 3 and further through upper and lower arms of a clamping jig which adjusts and temporarily fixes the position of a movable grating; also shown is a lamp housing mounted within the open end of an annular seat;

FIG. 5 is a plan view of the transducer and the clamping jig and illustrating a plurality of adjustment screws adapted to control the orientation of the movable grating rulings relative to those of the fixed grating;

FIG. 5a is a sectional view through the transducer and clamping jig, the same being taken substantially along the line 5a—5a of FIG. 5 and further illustrating the manner in which the adjusting screws contact a glass panel carrying the movagle grating FIG. 6 is a perspective illustration of the clamping jig showing the movable grating glass panel in phantom and illustrating the manner in which the grating angle is adjusted;

FIG. 7 is a perspective exploded view of the fixed and movable gratings further showing a transparent shim utilized to assure that both gratings lie in parallel planes accurately spaced from one another;

FIG. 8 is a fragmentary perspective illustration of a portion of the clamping jig and a control arm fixed to the movable grating and illustrating the employment of a temporary adhesive bond fixing the movable grating relative to the transducer body at an orientation wherein the rulings of the movable grating are parallel to the rulings of the fixed grating;

FIG. 9 is a fragmentary front elevational view of an optical fixture to which the transducer is mounted for predetermined placement of the grating angle to provide compensation for nonlinearities in scale load support deflection prior to final assembly;

FIG. 12 is a fragmentary perspective illustration of a portion of a subfixture adapted to reference the transducer relative to established vertical and horizontal planes of the scale assembly by a plurality of protuberances which contact the movable grating;

FIG. 14 is a perspective illustration of the manner in which the grating planes are referenced in the main scale assembly fixture;

DESCRIPTION OF THE PREFERRED EMBODIMENT

Figure 1:
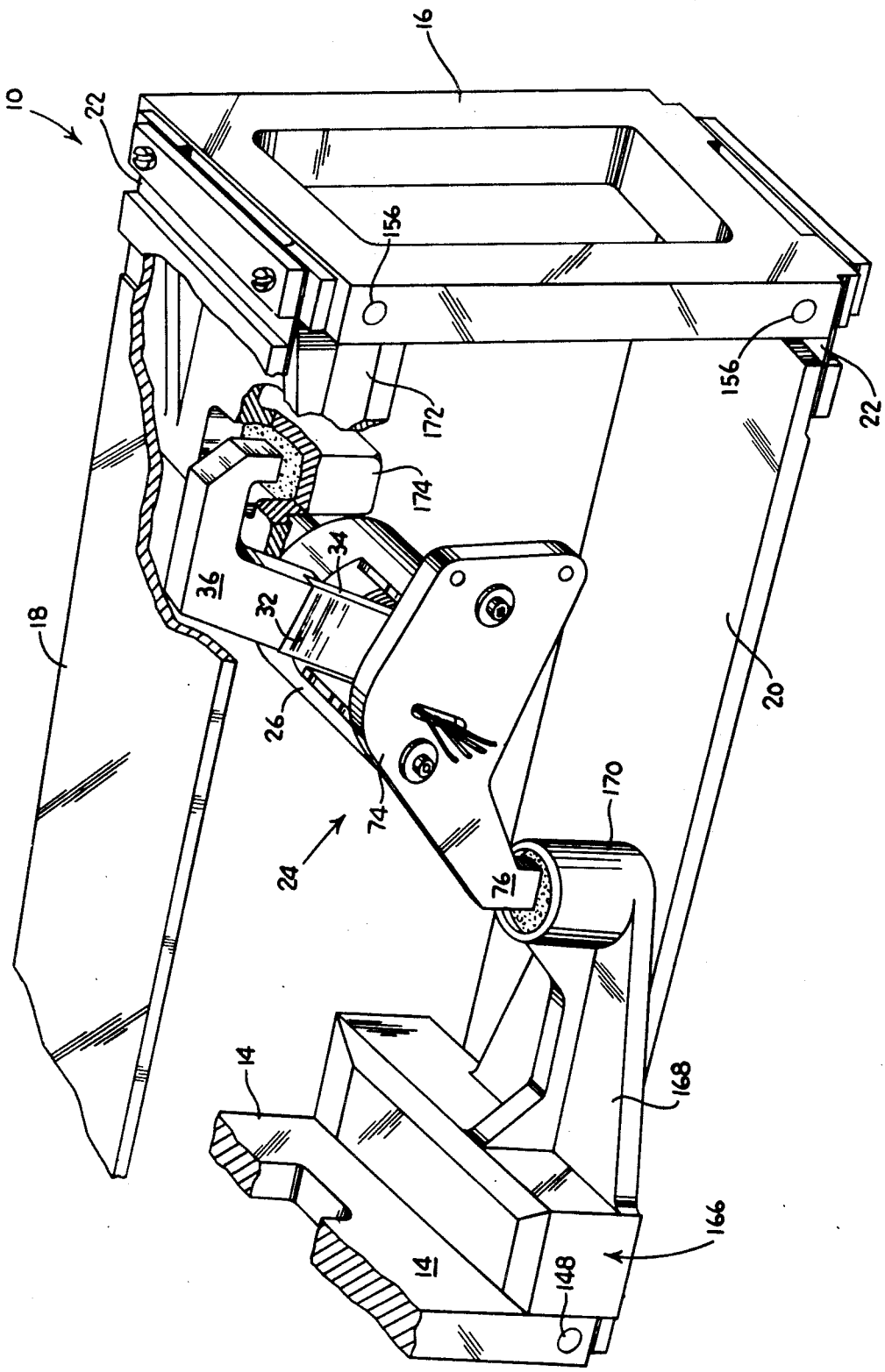
FIG. 1 is a perspective illustration of a scale assembly constructed in accordance with and embodying the invention with portions broken away and illustrating an optical transducer in situ.
Figure 10:
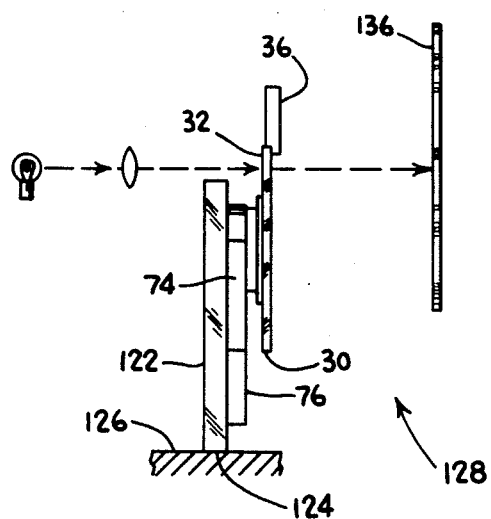
FIG. 10 is a side elevation view of the optical fixture and transducer with portions of the transducer deleted for clarity and illustrating, in schematized fashion, an optical comparator for measurement of the adjusted grating angle.
Figure 11:
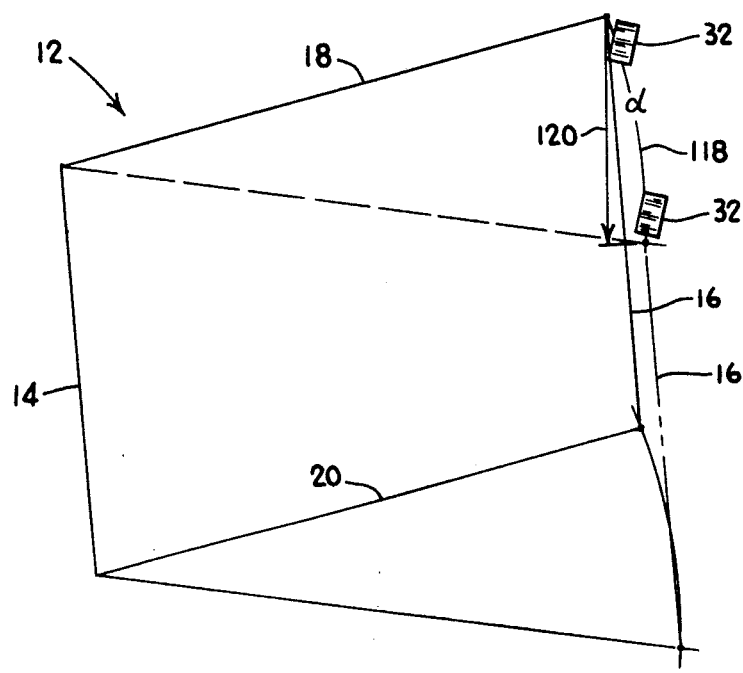
FIG. 11 is a schematized illustration of an exemplary scale parallelogram linkage and illustrating the actual load support deflection path for comparison with the vertical component thereof.

Referring now in detail to the drawings wherein the reference numeral 10 denotes generally a spring scale constructed in accordance with and embodying the invention, it will be seen that the scale 10 includes a load support structure adapted for constrained movement relative to a scale frame through a parallelogram linkage 12 (FIG. 11). The linkage 12 includes a vertical frame link 14, a vertical load support link 16, and relatively broad upper and lower control arms 18, 20 respectively interconnecting the opposed upper and lower ends of the vertical links. As shown in FIG. 1, in order to provide essentially frictionless pivots at the junctures between the ends of the control arms 18, 20 and the respective vertical links 14, 16 a flexible web 22 interconnects the ends of each of the control arms 18, 20 with the links 14, 16.

The scale load support structure additionally includes a scale pan (not shown) which receives the article to be weighed and a member engaging one end of a constant modulus spring, with the opposite end thereof being fixed to the scale frame so that the measured amount of deflection of the load support structure as a result of the placement of an article upon the pan will be directly proportional to the weight of the article. Alternatively, broad leaf springs may be substituted for the control arms 18,20.

In accordance with the present invention, an optical detector 21 is provided for precise measurement of the tare deflection. The detector 24 includes a transducer subassembly 26 which carries a fixed optical grating 28 formed on a glass panel 30 and a movable grating 32 carried on a glass panel 34. The movable grating 32 is adapted for movement with the load support structure and for this purpose the glass panel 34 is secured to an actuating arm 36 by a conventional adhesive such as an epoxy.

Operation of the optical detector 24 is premised upon the detection of movement of the scale load support by modulation of a light beam passing through both gratings 28, 32. To provide a light beam, a cylindrical lamp housing 38 (FIG. 4) is mounted at one end of the transducer subassembly 26. The lamp housing includes a lamp 40 and a collimating lens 42 positioned at opposite ends of the housing 38 and with the lamp 40 being spaced from the lens 42 a distance approximating the lens focal length to thereby provide essentially parallel light transmission through the grating sets 32, 28 to maintain integrity of optical resolution.

As mentioned heretofore, with one of the grating sets having its gratings at a skew angle to the other, a moire interference pattern will be generated. With the rulings of both gratings parallel, the interference pattern constitutes a cyclic light to dark modulation with the movable grating rulings acting as a shutter to block the light passing between the rulings of the fixed grating.

It has been found that in order to detect the direction of load support displacement a plurality of photodetectors providing signals in phase quadrature is desirable. Generally, phase quadrature outputs of photodetectors were provided by accurate placement of photodetectors.

To simplify production, the criticality of photodetector placement is greatly reduced by dividing the stationary grating 28 into four discrete grating zones 44, 46, 48 and 50 with the gratings of zone 44 displaced 180° from the gratings of zone 46 and the gratings of zone 48 phase displaced 180° from the gratings of zone 50. Further, the gratings of zone 44 are phase displaced 90° from the gratings of zone 48, and a 90° phase displacement is provided between zones 46 and 50. The photodetector outputs may be processed to provide pulse signals indicative of load support structure displacement as is well known in the art.

A plurality of photodetectors 52, 54, 56 and 58 are positioned within appropriate recesses of a nonconducting mounting panel 60 with the fixed grating glass 30 abutting the panel 60 such that one of the photodetectors is registered with each of the grating zones.

While the utilization of the parallelogram linkage 12 having broad upper and lower control arms 18, 20 reduces load support deflection in a plane transverse to the load deflection plane to thereby maintain constant spacing between the grating planes during deflection, initial adjustment for angularity between the rulings of each grating, clearance between grating planes and parallelism between grating planes is still necessary.

In accordance with the invention, the transducer 26 is assembled as a separate unit apart from the scale linkage 12 after having all of the optical parameters preadjusted and fixed. The transducer 26 includes a generally U-shaped housing 62 having a pair of parallel legs 64, 66 extending from an end wall 68 which includes a threaded central aperture 70. The aperture 70 receives a matingly threaded annular lamp seat 72. The transducer legs 64, 66 are joined at their opposite ends by a cover plate 74 having a depending anchoring arm 76 for the purpose of fixing the transducer 26 relative to the scale frame link 14.

As heretofore mentioned, an aspect of the invention relates to setting the orientation of the grating rulings with respect to a horizontal plane to thereby optically compensate for nonlinearities in load support deflection and manufacturing tolerances. In order to achieve such compensation cover plate 74 and its anchoring arm 76 may be secured to the transducer body 62 at a predetermined angular relationship so that adjustment for nonlinearities is not required during subsequent scale assembly procedures. For this purpose a pair of opposed arcuate slots 80 are formed in the face of the cover plate 74 through which a pair of socket head screws 82 engage matingly threaded apertures 84 on the ends of the transducer legs 62, 64. A pair of washers 83 may be provided to assure tight engagement over the slots 80.

Parallel side edges of the mounting panel 60 and a spacer plate 86 are received between opposed channels 78 formed in the transducer legs 64, 66 adjacent the cover plate end. Electrical leads from the photodetectors extend through a slot in the spacer plate 86 and a corresponding slot 88 in the cover plate 74. It should be appreciated that the channels 78 receive the photodetector mounting panel 60 such that the grating 28 and photodetectors fixed thereto move as a unit with the transducer body 62 during any adjustment of the orientation of the transducer body 62 relative to the cover plate 74.

In assembling the transducer 26 the fixed grating glass 30, the photodetectors 52, 54, 56, 58 in their panel 60, the spacer panel 86 and the cover plate 74 are secured to the transducer body 62 through the use of the socket head screws 82 which tighten the cover plate 74 against the transducer 26. Thereafter, the movable grating 32 is positioned adjacent yet spaced from the fixed grating 28, and a transparent shim 90 of uniform thickness is inserted between the two gratings 28, 32. The shim 90 may be formed of any suitable material, for example mylar, and has a thickness equal to the desired spacing between the gratings 28, 32.

In order to maintain proper spacing between the gratings 28, 32 as defined by the thickness of the shim 90, a compressive force is applied against the rear face of the movable grating glass 34 by a helical spring 92 which is seated at one end against the lamp seat 72 and at its other end on a collar 94.

By way of example, the gratings 28, 32 of the present invention are shown with their respective rulings in parallel orientation to provide a shutter effect in light modulation. For this reason, the movable grating 32 is aligned so that its rulings are parallel to those of the fixed graing 28 as observed at the grating zones 44, 46, 48 and 50.

In order to provide accurate adjustable control of the orientation of the grating 32, a clamping jig 96 is provided. Referring now to FIG. 6 wherein a perspective illustration of the jig 96 is shown, it will be observed that the jig 96 is adapted to extend around three edges of the movable glass 34. The jig 96 includes a side beam 98 and a bottom beam 100 lying within the plane of the glass 34. A top beam 102 is offset behind the plane of the glass 34 and includes a depending leg having an aperture to receive a mounting screw 104 for securement of the jig 96 to the leg 64 of the transducer body 62.

The side beam 98 includes a pair of spaced horizontal bores through each of which an adjustment screw 106 is threadingly engaged with the distal end of each screw 106 contacting an edge 110 of the movable glass 34.

The opposite edge of the movable glass 34 is contacted by a further adjustment screw 112 which is threadingly received in the tranducer leg 66 as shown in FIGS. 5 and 5a. With the adjustment screw 112 spaced between the oppositely directed screws 106, lateral angular adjustment of the movable glass 34 may be achieved by rotation of the screws 106 and 112.

During assembly of the transducer 26 the movable glass 34 is positioned against the shim 90 and the spring 92 and collar 94 mounted, the gratings are optically sighted and a rough parallel relationship between the rulings can be set by eye, parallelism being approached when moire interference patterns are removed from the observed grating zones 44, 46, 48 and 50.

Accurate final adjustment of the grating 32 with respect to the grating 28 is achieved by positioning the lamp housing 38 in the lamp seat 72, actuating the lamp 40, amplifying the signals of at least two of the photodetectors and feeding the amplified signals to an oscilloscope for waveform observation.

Generally, it is only necessary to process the signals from two photodetectors positioned behind 180° phase displaced grating zones. Thus, for example, the outputs of photodetectors 52 and 54 may be amplified and fed to an oscilloscope. With the lamp 40 on, slight up and down movement of the movable grating 32 will produce observable patterns on the oscilloscope and the light to dark ratios can be observed to determine whether recognizable signal magnitudes have been provided.

To check for parallelism between the rulings of the two gratings, the orientation of the movable glass is trimmed through the use of the adjustment screws 106 and 112 until a 180° spread is noted between the waveforms produced upon manual up and down movement of the grating 32.

Thereafter, the movable grating is temprarily fixed with the control arm 36 in an uppermost position such that a stop 114 abuts the underside of the clamping jig top beam 102. At this juncture, further movement of the movable grating is prevented by the placement of an adhesive, e.g., epoxy, bond 116 between the top beam 102 and the control arm 36 as shown in FIG. 8.

With reference now to FIG. 11 showing a schematized illustration of the scale parallelogram linkage 12, it will be observed that the load support link 16 deflects in an arcuate path 118 a distance "d" for a given article load weight. If the rulings of the gratings 32, 28 are horizontally oriented, the optical signals generated would indicate only the vertical component 120 of such displacement. It has been found in accordance with the invention that optical compensation for nonlinearities in load support deflection can be achieved by positioning the rulings of the gratings 28, 32 at a predetermined angle with respect to a horizontal plane. Thus, in order to provide a full light to dark transition, the load support link 16 must move in a vertical direction a distance greater than the actual spacing between successive rulings of the movable grating. The actual compensating angle is determined after consideration of many parameters which effect load support motion and induce nonlinearities. For example, the curavture of the path of travel is affected by the length of the control arms. Further, the limits of such arcuate travel between no load and maximum load have to be accounted for.

Once the movable grating 32 is temporarily fixed by the bond 116, the compensating angle may be set by reference only to the movable grating since the rulings of both are parallel. An optical fixture 122 is provided for setting the compensating grating angle with respect to the scale frame by adjusting the orientation between the transducer body 62 and the cover plate 74. The fixture 122 includes a planar base 124 for registration on a planar bed 126 of an optical comparator 128. A pair of spaced pins 130 project from the optical fixture 122 and extend through mating apertures 132 in the cover plate 74. The transducer is supported from the fixture 122 with the outer face of the transducer flush against a vertical wall of the fixture 122 and the engagement between the pins 130 and the apertures 132 serve to reference the cover plate 74 to both vertical and horizontal base planes.

In order to permit the cover plate to abut the fixture 122 and for the purpose of facilitating adjustment of the grating angle, a pair of oversized apertures 134 extend through the fixture 122 in registration with the slots 80 and the socket head screws 82.

The optical comparator 128 provides an optical measurement of the angular orientation of the rulings of the grating 32 by projecting a collimated light beam from a lamp through a portion of the grating 32 extending above the transducer body 62. The image of the grating rulings is projected on a screen 136.

By loosening the screws 82 and rotating the transducer body 62, the corrective angle of grating rulings may be set after which the screws 82 are tightened and the transducer subassembly 26 removed from the fixture 122 and placed in stock ready for use in subsequent assembly of the scale.

During assembly of a scale 10 a transducer subassembly 26 is selected and positioned within a main assembly fixture 138. The assembly fixture 138 includes a generally planar upright rear plate 140, the inner face of which constitutes a vertical scale reference plane. A plurality of horizontal struts 142 position a front plate 144 in spaced parallel relationship with the rear plate 140.

The frame link 14 is mounted to the main assembly fixture 138 and spaced between the plates 140 and 144 by a plurality of cylindrical couplings 146. Each coupling includes a pin at one end which seats in a socket 148 formed in the frame link 14. The opposite end of each coupling 146 abuts the rear or front plate 149, 144 and includes an aperture for receiving a locating pin 150 which extends through the rear plate 140 or screws 152 which extend through the front plate 144.

The load support link 16 is mounted between the plates 140, 144 by a plurality of cylindrical couplings 154 which include a pin at one end and which seats in a socket 156 of the load support link 16. The opposite end of each coupling 154 includes an aperture for receiving a locating pin 150 which extends through the rear plate 140 or screws 152 which extend through the front plate 144.

It will be seen that the screws 152 urge the frame link 14 and the load support link 16 against the referencing vertical plane of the rear plate 140 and additionally reference the links 14, 16 with respect to a horizontal base plane 164.

A horizontal boss 166 projects from the lower end of the frame link 14 and includes a web 168 which terminates at an upwardly extending open container or pot 170. In accordance with the invention, the anchoring arm 76 of the transducer subassembly 26 is adhesively bonded in the pot 170 to fix the transducer body 62 relative to the scale frame.

A corresponding horizontal boss 172 extends from the upper end of the load support link 16 toward the interior of the parallelogram linkage 12. The boss 172 includes a similar upwardly extending open well or pot 174 for providing a corresponding adhesively bonded anchor between a depending segment of the movable glass control arm 36 and the load support link 16 so that the grating 32 will move with the tare link 16.

A transducer subfixture 176 is provided in order to reference the transducer body and the movable greating 32 for bonding with respect to the scale linkage. The transducer subfixture 176 includes a substantially vertical mounting plate 178 having a pair of locating pins 180 (FIG. 12) corresponding to the pins 130 of the optical fixture which extend into the apertures 132 of transducer cover plate 74 to reference the adjusted grating angle with respect to the reference planes of the scale assembly. It should be appreciated that the transducer body 62 has already been adjusted for angular orientation of gratings by utilizing the optical comparator 128 and tightening the screws 82 which anchor the cover plate 74 to the transducer body.

In order to establish the planes of the gratings 28, 32 with respect to reference planes of the scale assembly, the movable grating plane is located and referenced through the utilization of three protuberances 182, 184 and 186 which extend from the mounting plate 178 toward the movable grating 32 and define a plane parallel to the plane of the rear plate 140 and perpendicular to the base plane 164. It should be appreciated that the dimensions and orientation of the protuberances 182, 184 and 186 are such that the upper protuberances 182 and 184 extend from the mounting plate 178 across the top of the cover plate 74, the spacer 86, the panel 60, the glass 30 and the shim 90 to contact the grating 32. Similarly, the lower protuberance 186 extends beneath the plate 174, the spacer 86, the panel 60, the glass 30 and the shim 90 to contact the grating 32.

The transducer subfixture 176 is referenced itself to vertical and horizontal reference planes by a plurality of horizontal spacing rods 188 mounted at one end to the rear plate 140 and at the other end to the mounting plate 178 of the transducer subfixture 176.

Figure 13:
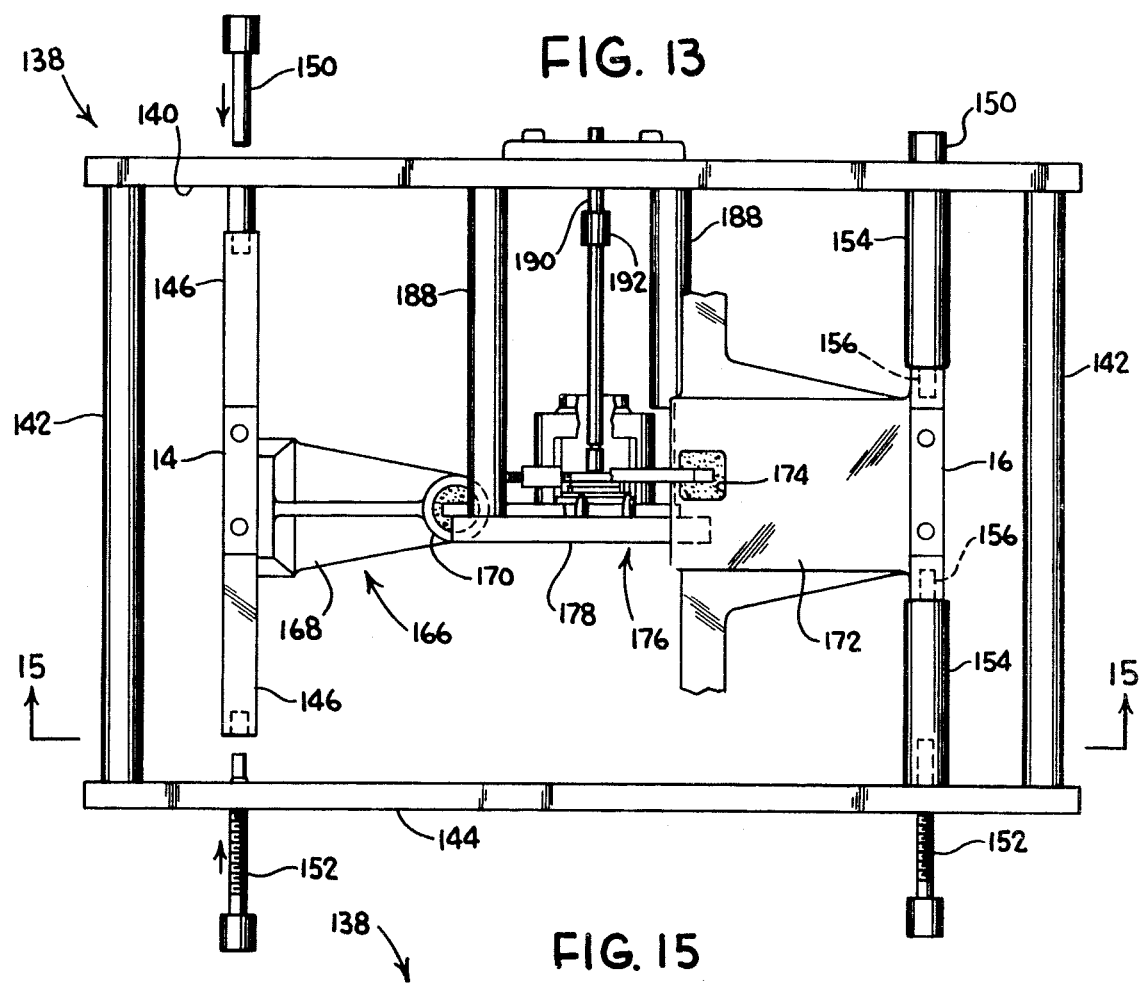
FIG. 13 is a plan view of a main assembly fixture and showing a frame link positioned for reception of an anchoring arm of the transducer and a scale load support link positioned for reception of a control arm joined to the movable grating; further illustrated is the subfixture carrying the transducer and a probe for registering the movable grating with the protuberances projecting from the subfixture.
Figure 15:
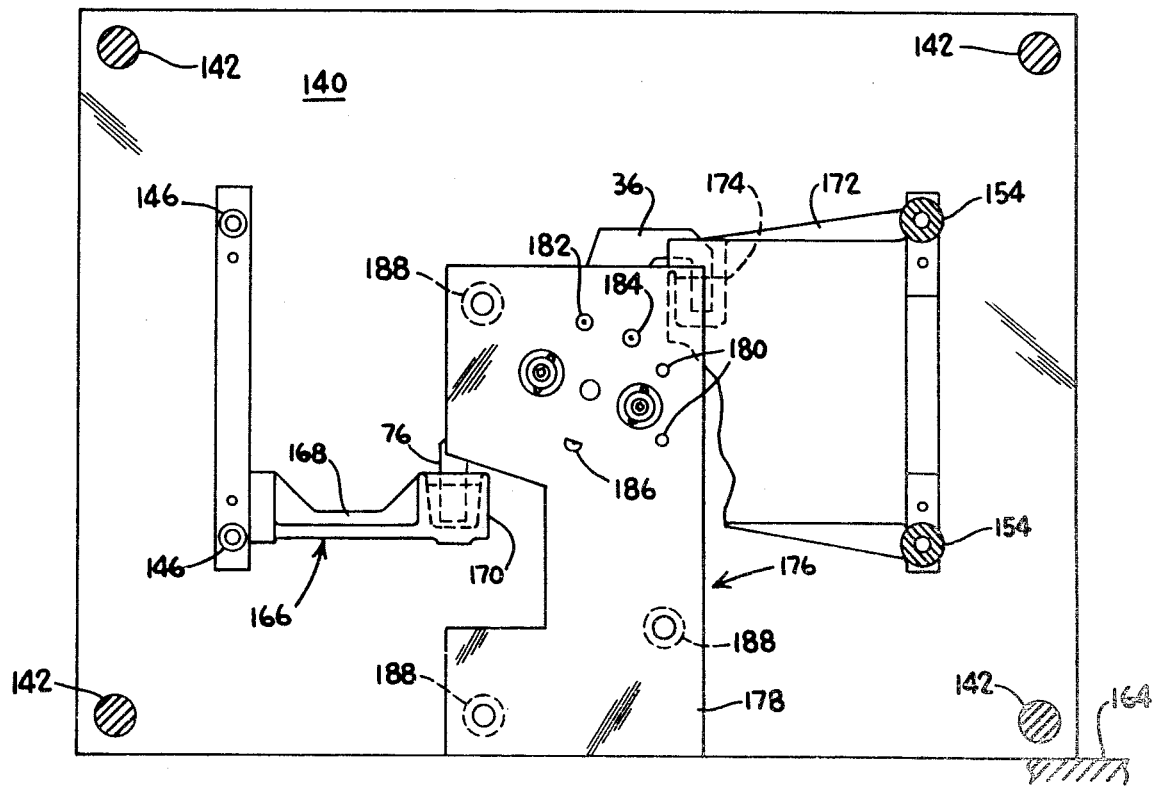
FIG. 15 is a sectional view through the main assembly fixture, the same being taken substantially along the line 15—15 of FIG. 13.

The movable grating plane as referenced by the three protuberances 182, 184 and 186 is maintained by applying pressure against the rear face of the movable grating glass 34 through the use of an adjustable pressure probe 190 as shown in FIGS. 13 and 14. The pressure probe 190 extends through an aperture in the rear plate 140 to contact the glass 34. It should be appreciated that it is necessary to remove the lamp housing 38 from the lamp housing seat 72 in order to position the pressure probe 190. A threaded collar 192 is provided in the probe 190 to apply an appropriate pressure to maintain the gratings, as well as the transducer body 62, in the appropriate position with respect to established reference planes.

Once the transducer subassembly 26 is positioned, the transducer body is fixed with respect to the frame link 14 by cementing the portion of the anchoring arm 76 which extends into the pot 170 through the use of a suitable bonding agent, for example Devcon F-2 80% Aluminum Filled Epoxy distributed by Devcon Company, Danvers Mass. It may be appreciated that in order to provide an efficacious bond an aperture may be formed through the anchoring arm 76.

Similarly, the portion of the control arm 36 extending into the bad support link pot 174 is also cemented with a similar bonding agent so that the movable grating will move as a unit with the load support link 16. After the bonding agent has set, the probe 190 and the subfixture 176 are removed. Further, the lamp housing seat 72 is temporarily removed in order to remove the spring 92 and collar 94.

The movale grating is freed for movement with the load support by breaking the epoxy bond 116 which has temporarily held the movable grating 32 to the clamping jig 96. Additionally, the clamping jig 96 is removed from the transducer body 62 and the movable grating 32 is thus free for movement with the load support link 16 relative to the transducer body.

Figure 16:
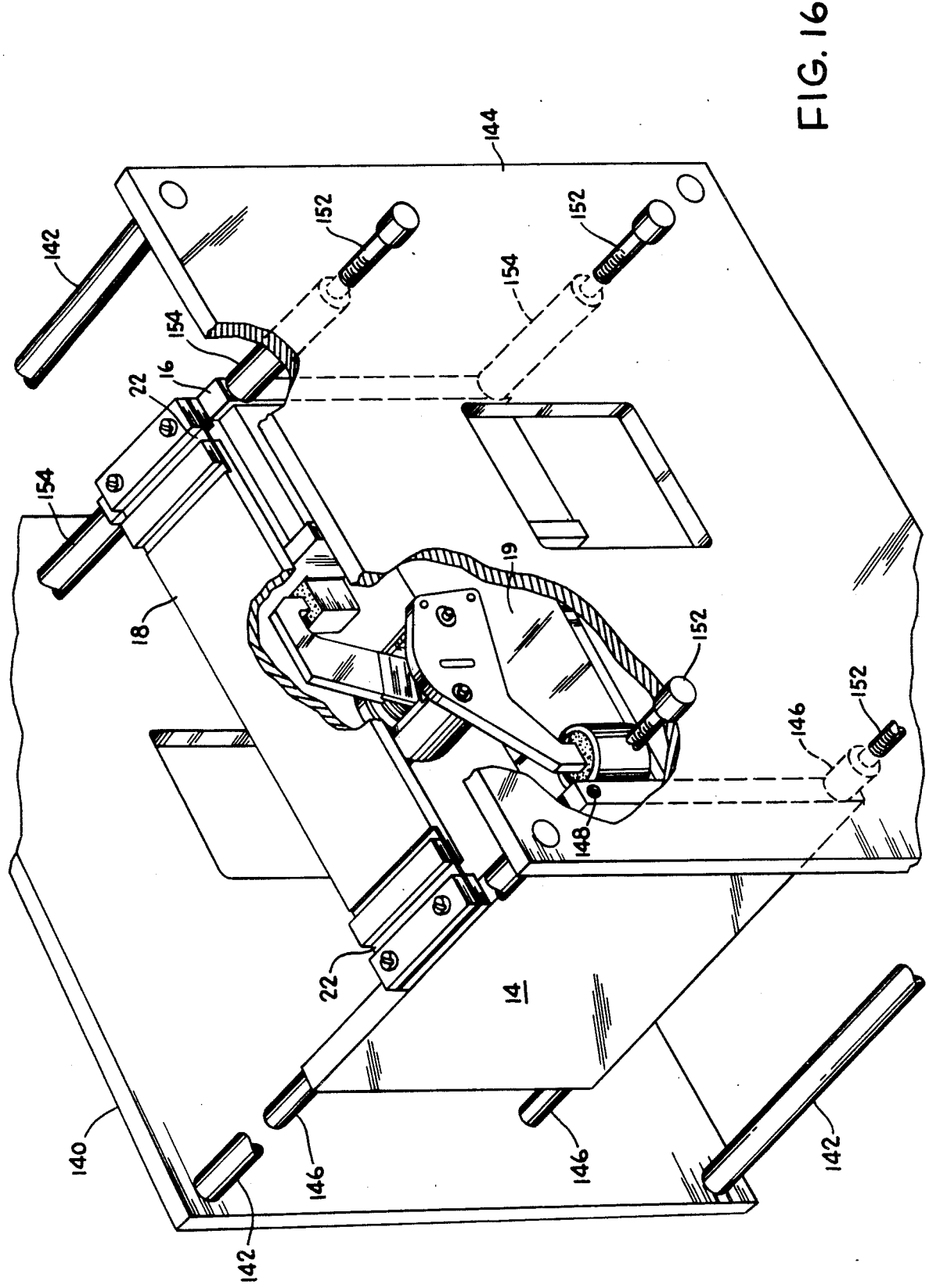
FIG. 16 is a further view of the main assembly fixture in perspective with portions broken away and illustrating a further stage of the scale assembly subsequent to removal of the subfixture and the setting of the bond between the transducer body and the frame and between the movable control arm and the load support.

The lamp housing is remounted to complete the optical detector, and the balance of scale linkage is assembled. Exemplary of such subsequent assembly steps is the mounting of the upper and lower linkage control arms 18 and 20 as shown in FIG. 16.

Thus, it will be seen that there is provided a mass produced weight measuring system and method of producing same which achieves the various objects of the invention and is well adapted to meet the conditions of practical use.

Since various embodiments may be made of the present invention and various changes may be made in the exemplary embodiment and method above set forth, it is to be understood that all matter described herein and shown in the accompanying drawings is to be interpreted as illustrative and not in a limiting sense.

Having thus described the invention, there is claimed as new and desired to be secured by Letters Patent:

1. A fixture to facilitate assembly of a weight measuring system for determining the weight of an article, the system including a scale assembly, the assembly comprising a frame link, a load support link, and means providing displacement of the load support link with respect to the frame link as a function of the weight of an article, the system further including an optical detector adapted to measure load support link displacement, the detector comprising a light source adapted to generate a light beam, photodetector means positioned at the end of the light beam, an optical grating, the grating being carried by the detector and positioned between the light source and the photodetector means, the fixture comprising means adapted to position the frame link with reference to a vertical base plane and a horizontal base plane, means adapted to position the load support link with reference tod the vertical base plane and the horizontal base plane and means adapted to independently position the grating with reference to the vertical base plane and the horizontal base plane to thereby facilitate anchoring the grating to the frame link by potting whereby the grating may be preadjusted with respect to the base planes.

2. A fixture to facilitate assembly of a weight measuring system constructed in accordance with claim 1 wherein the detector includes a second optical grating adapted to be fixed relative to the load support link for unitary movement therewith, the means adapted to independently position the grating being adapted to simultaneously position both gratings, whereby the second grating may be fixed to the load support link by potting.

3. A fixture to facilitate assembly of a weight measuring system constructed in accordance with claim 2 wherein each of the gratings is formed on a transparent planar panel and the means adapted to position the gratings includes means adapted to provide three point contact with one of the panels.

4. A fixture to facilitate assembly of a weight measuring system as constructed in accordance with claim 2 the detector further including means to temporarily hold the second grating in a predetermined relationship with reference to the first grating, each of the gratings being formed on a transparent planar panel, the means adapted to position the grating including means adapted to provide three point contact with the panel of the second grating.

5. A fixture to facilitate assembly of a weight measuring system as constructed in accordance with claim 4 wherein the three point contact is provided at one face of the second grating panel, the fixture including means applying a force against the opposite face of the second grating panel.

6. A fixture to facilitate assembly of a weight measuring system constructed in accordance with claim 2 further including a pair of spaced plates, each plate having at least one planar face, the faces of the plates being parallel to one another, the means adapted to position the frame link including means extending between the faces, the extending means being adapted to engage the frame link and reference the frame link to the face of one plate.

7. A fixture to facilitate assembly of a weight measuring system constructed in accordance with claim 6 wherein the means adapted to position the load support link includes means extending between the faces, the load support link extending means being adapted to engage the load support link and reference the load support link to the face of one plate.

8. A fixture to facilitate assembly of a weight measuring systems constructed in accordance with claim 7 wherein the extending means comprises a coupling, the fixture further including locating means fixing the coupling with reference to the face of the one plate.

9. A fixture to facilitate assembly of a weight measuring system constructed in accordance with claim 3 wherein the means adapted to position the gratings includes a mounting plate, the three point contact means extending from the mounting plate.

10. A fixture to facilitate assembly of a weight measuring system constructed in accordance with claim 9 further including a pair of spaced plates, each plate having at least one planar face, the faces of the plates being parallel to one another, the mounting plate being positioned between the faces and means extending between the face of one plate and the mounting plate, the extending means being adapted to reference the mounting plate to the face of the one plate.

* * * * *